(12) United States Patent
Cone et al.

(10) Patent No.: US 7,293,112 B2
(45) Date of Patent: Nov. 6, 2007

(54) GRAPHICAL PROGRAM NODE FOR DISPLAYING ACQUIRED IMAGES

(75) Inventors: Evan W. Cone, Austin, TX (US); Johann G. Scholtz, Austin, TX (US); Jeffrey J. Kellam, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 963 days.

(21) Appl. No.: 10/292,260

(22) Filed: Nov. 12, 2002

(65) Prior Publication Data
US 2004/0090471 A1     May 13, 2004

(51) Int. Cl.
    *G06F 13/00* (2006.01)
(52) U.S. Cl. .............. 709/250; 719/329; 717/105
(58) Field of Classification Search ........... 709/217, 709/230, 250; 719/321, 328, 3
    See application file for complete search history.

(56) References Cited

U.S. PATENT DOCUMENTS

| | | | |
|---|---|---|---|
| 4,831,580 A | 5/1989 | Yamada | |
| 5,005,119 A | 4/1991 | Rumbaugh et al. | |
| 5,481,712 A | 1/1996 | Silver et al. | |
| 5,546,519 A * | 8/1996 | Berry | 715/763 |
| 5,911,070 A | 6/1999 | Solton et al. | |
| 5,940,296 A | 8/1999 | Meyer | |
| 6,061,602 A | 5/2000 | Meyer | |
| 6,167,562 A | 12/2000 | Kaneko | |
| 6,173,438 B1 * | 1/2001 | Kodosky et al. | 717/109 |
| 6,226,783 B1 | 5/2001 | Limondin et al. | |
| 6,288,474 B1 | 9/2001 | Ono et al. | |
| 6,298,474 B1 | 10/2001 | Blowers et al. | |
| 6,408,429 B1 | 6/2002 | Marrion, Jr. et al. | |
| 6,637,022 B1 | 10/2003 | Weeren et al. | |
| 6,763,515 B1 | 7/2004 | Vazquez et al. | |
| 6,819,355 B1 * | 11/2004 | Niikawa | 348/207.11 |
| 6,961,514 B1 * | 11/2005 | Neuman et al. | 386/117 |

OTHER PUBLICATIONS

US 6,094,526, Marrion et al. (withdrawn).
Optilab Image Processing and Analysis Software for the Apple Macintosh™ II, User's Manual, dated 1990.
MacUser, John Rizzo, Image Analyst and Enhance, Jul. 1990, pp. 55-58.

(Continued)

*Primary Examiner*—Viet D. Vu
(74) *Attorney, Agent, or Firm*—Meyertons Hood Kivlin Kowert & Goetzel, P.C.; Jeffrey C. Hood

(57) ABSTRACT

A display node in a graphical program may be used to automatically transfer an image from an embedded device lacking display capabilities to another device having a display. A method for displaying an image involves creating a graphical program on a display in response to user input and executing the graphical program on a first embedded system. The graphical program may include a first node for acquiring an image and a second node for displaying the image. If the first embedded system is coupled to a second system having a display device, executing the graphical program involves the second node transferring the image to the second system and directing the second system to display the image on the display device of the second system. If the first embedded system is not coupled to a second system having a display device, the second node may perform no display operation during execution.

47 Claims, 9 Drawing Sheets

OTHER PUBLICATIONS

SPIE—The International Society for Optical Engineering, Steven Rosenthal and Larry StahlAerg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

Advanced Imaging, Special Report: Imaging and the Macintosh/Robust Image Databases, Apr. 1991, pp. 18-32.

"IMAQ Vision Builder Tutorial," National Instruments, Jan. 1999.

Hunt, Neil, "IDF: A graphical datadlow programming language for image processing and computer vision", p. 351-360, IEEE 1990, retrieved from the IEEE database Jan. 7, 2003.

Keddy, W.A., Agathoklis, P., "DEDIP: A user-friendly environment for digital image processing algorithm development", p. 733-736, IEEE 1991, retrieved from the IEEE database Jan. 7, 2003.

Konstantinides, Konstantinos, Rasure, John R., "The Khoros Software Development Environment for Image and Signal Processing", p. 1-14,, 1992, retrieved from http://www.hpl.hp.com/techreports/92/HPL-92-96.pdf on Jan. 7, 2003.

Sim, Young-Seok, Lim, Chae-Seong, Moon, Young-Shik, Park, Sung-Han, "Design and Implementation of the Visual Programming Environment for the Distributed Image Processing", p. 149-152, IEEE 1996, retrieved from IEEE database Jan. 7, 2003.

\* cited by examiner

GRAPHICAL PROGRAM NODE FOR DISPLAYING ACQUIRED IMAGES

FIELD OF THE INVENTION

The present invention relates to graphical programming and image acquisition, and, in particular, to a node in a graphical program that operates to display acquired images either on the embedded device in which the graphical program is executing or on one or more other devices.

DESCRIPTION OF THE RELATED ART

Traditionally, programmers have used high-level text-based programming languages to write application programs. Many different high-level programming languages exist, including BASIC, C, FORTRAN, Pascal, COBOL, ADA, APL, etc. Programs written in these high level languages are translated to the machine language level by translators known as compilers or interpreters. The high level programming languages in this level, as well as the assembly language level, are referred to as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which users must master before they can efficiently program computer systems in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling is often reduced.

Examples of fields in which computer systems are employed to interact with physical systems are the fields of instrumentation (including image acquisition), process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include several interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment in which a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface (GUI). For example, in creating a graphical program, a user may create a front panel or user interface panel. The front panel may include various graphical user interface elements or front panel objects, such as user interface controls and/or indicators that represent or display the respective input and/or output that will be used by the graphical program or VI, and may include other icons which represent devices being controlled. The front panel may be included in a single window of user interface elements, or may include several individual windows each having one or more user interface elements, where the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may include front panel objects, e.g., the GUI, embedded in the block diagram.

During creation of the block diagram portion of the graphical program, a user may select various function nodes or icons that accomplish a desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus, the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, a unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application, the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In many applications it is necessary or desirable to acquire an image from a scene and display the acquired image. However, the image acquisition device may not have inherent display capabilities. For example, image acquisition may be performed by a smart camera or the combination of a camera and an image acquisition board that does not include a display. If an image acquisition program is running on such an embedded target that does not have inherent display capabilities, or that has limited display capabilities, a programmer may have to write transfer code designed to transfer the acquired images from the embedded target to a device that does have the desired display capabilities. This transfer code may be neither trivial to write nor reusable, leading to inefficiency and frustration. Accordingly, it is desirable to be able to easily transfer an image from a device lacking desired display capabilities to one that provides the desired capabilities.

SUMMARY OF THE INVENTION

Various embodiments of methods and systems for using a display node to automatically transfer an image from an embedded device lacking display capabilities to another device having a display are disclosed. In one embodiment, a method for displaying an image involves creating a graphical program on a display in response to user input. The graphical program is executed on a first embedded system. The graphical program may include a first node (or more than one first node) for acquiring an image and a second node for displaying the image. If the first embedded system is coupled to a second system having a display device, executing the graphical program may involve: the second node transferring the image to the second system and directing the second system to display the image on the display device of the second system. The second node may transfer the image to the second system and cause the image to be displayed on the display device of the second system without requiring any user written code. If the first embedded system is not coupled to a second system having a display device, the second node may perform no display operation during execution.

In one embodiment, the second system may be a host computer system, and the first embedded system may be a device (e.g., a card coupled to a slot in the host computer system) that has a functional unit that is operable to execute the graphical program. In another embodiment, the first embedded system and the second system are both coupled to a network. The second node may be operable to transfer the image across the network to the second system without requiring any user-written network code.

If the graphical program is executed on a system that includes a display device (e.g., if the graphical program is executed by a CPU within a host computer system), execution of the second node may operate to display the image on the host computer system's display device. Therefore, the second node may be polymorphic with respect to the type of system in which the second node is executed. In other words, the second node may perform different operations depending on whether the graphical program that includes the second node executes on a system having a display device, on an embedded system coupled to a system having a display device, or on an embedded system that is not coupled to a system having a display device.

The second node may direct the second system to display the image by transferring control information with the image. The control information may also direct the second system to display a region of interest of the image on the display device. In some embodiments, the control information may direct the second system to display options corresponding to several user-selectable tools on the display device, to display the image at certain coordinates on the display device, and/or to display a timestamp indicating a time at which the image was acquired on the display device.

In some embodiments, the second node may operate to automatically detect whether the first embedded system is 1) coupled to a host computer system; or 2) coupled to a network. The second node may operate to transfer the image to another system if the first embedded system is either 1) coupled to a host computer system; or 2) coupled to a network. The second node may also operate to compress the image prior to transfer and/or to decompress the image prior to display.

In other embodiments, a method for displaying an image may involve: creating a graphical program on a display in response to user input, where the graphical program includes a first node for acquiring an image and a second node for displaying the image; and executing the graphical program on a first embedded system. If the first embedded system is coupled to a second system having a display device, the second node operates during execution to transfer the image to the second system and to cause the image to be displayed on the display of the second system. If the first embedded system is not coupled to a second system having a display device, the second node performs no display operation during execution.

In yet other embodiments, a method for displaying an image may involve: creating a graphical program on a display in response to user input, where the graphical program includes a first node for acquiring an image, and a second node for displaying the image; and executing the graphical program on a first system. If the first system includes a display, the second node operates to display the image on the display of the second system. If the first system is an embedded system, and the embedded system is coupled to a second system having a display device, the second node operates during execution to transfer the image to the second system and cause the image to be displayed on the display of the second system. If the first system is an embedded system, and the embedded system is not coupled to a second system having a display device, the second node performs no display operation during execution.

A method for displaying an image may, in some embodiments, involve: creating a graphical program on a display in response to user input, where the graphical program includes a first node for acquiring an image, and a second node for displaying the image; executing the graphical program on a first system which includes a display device, where the second node operates to display the image on the display device of the first system; executing the graphical program on a second embedded system, where the second embedded system is coupled to a third system having a display device and the second node operates to transfer the image to the third system and cause the image to be displayed on the display device of the third system; and executing the graphical program on a fourth embedded system, where the fourth embedded system is not coupled to any system having a display device and the second node performs no display operation during execution.

In another embodiment, a method for displaying an image may involve: creating a program in response to user input, where the program includes a first subroutine for acquiring an image and a second subroutine for displaying the image, and where the first and second subroutines are provided to a user in a library of subroutines. The program may be executed on a first system that includes a display device. In this instance, the second subroutine may operate to display the image on the display device of the first system. The program may also be executed on a second embedded system, where the second embedded system is coupled to a third system having a display device and where the second subroutine operates during execution on the second embedded system to transfer the image to the third system and cause the image to be displayed on the display device of the third system. The program may further be executed on a fourth embedded system, where the fourth embedded system is not coupled to any system having a display device and the second node performs no display operation during execution on the fourth embedded system.

Yet another embodiment of a method for displaying an image may involve: creating a program in response to user input, where the graphical program includes a first subroutine for acquiring an image and a second subroutine for displaying the image and where the first subroutine and the second subroutine are provided to a user in a library of subroutines; and executing the program on a first embedded system. If the first embedded system is coupled to a second system having a display device, execution of the program may further involve: the second subroutine transferring the image to the second system; the second subroutine directing the second system to display the image on the display device of the second system; and if the first embedded system is not coupled to a second system having a display device, the second subroutine performing no display operation during execution.

In some embodiments, a computer accessible medium may include program instructions executable to: create a program in response to user input, where the program includes a first subroutine for acquiring an image and a second subroutine for displaying the image, and where the first subroutine and the second subroutine are provided to a user in a library of subroutines; and, if the second subroutine is executed by a first embedded system coupled to a second system having a display device, the second subroutine is operable to: transfer the image to the second system and direct the second system to display the image on the display device of the second system. If the first embedded system is not coupled to a second system having a display device, the second subroutine may perform no display operation during execution.

In other embodiments, a computer accessible medium may include program instructions executable to create a graphical program on a display in response to user input. The graphical program is operable to acquire an image and includes a first node for displaying the image. If the first node is executed on a first embedded system coupled to a second system having a display device, the first node is operable to: transfer the image to the second system; and direct the second system to display the image on the display device of the second system.

One embodiment of a method for displaying an image may involve creating a graphical program on a display in response to user input, where the graphical program is operable to receive an image, and where the graphical program includes a first node for displaying the image and executing the graphical program on a first embedded system. The first node is polymorphic to perform different operations depending on whether the embedded system is coupled to a display device.

Various embodiments of a node in a graphical program may include: an icon which represents the node in the graphical program; and program instructions which are executable to receive an acquired image and selectively transfer the acquired image depending on whether a device executing the graphical program comprising the node is coupled to a display device. In a similar embodiment, a node in a graphical program may include: an icon that represents the node in the graphical program; and program instructions which are executable to receive an acquired image. If a first device executing the graphical program comprising the node is coupled to a second device having a display, the program instructions are executable to: transfer the acquired image to the second device; and direct the second device to display the acquired image. If the first device executing the graphical program has inherent display capabilities, then the program instructions may operate to display the acquired image using the inherent display capabilities and may not operate to transfer the acquired image to the second device.

BRIEF DESCRIPTION OF THE DRAWINGS

A better understanding of the present invention can be obtained when the following detailed description of the preferred embodiment is considered in conjunction with the following drawings, in which.

Figure 1:
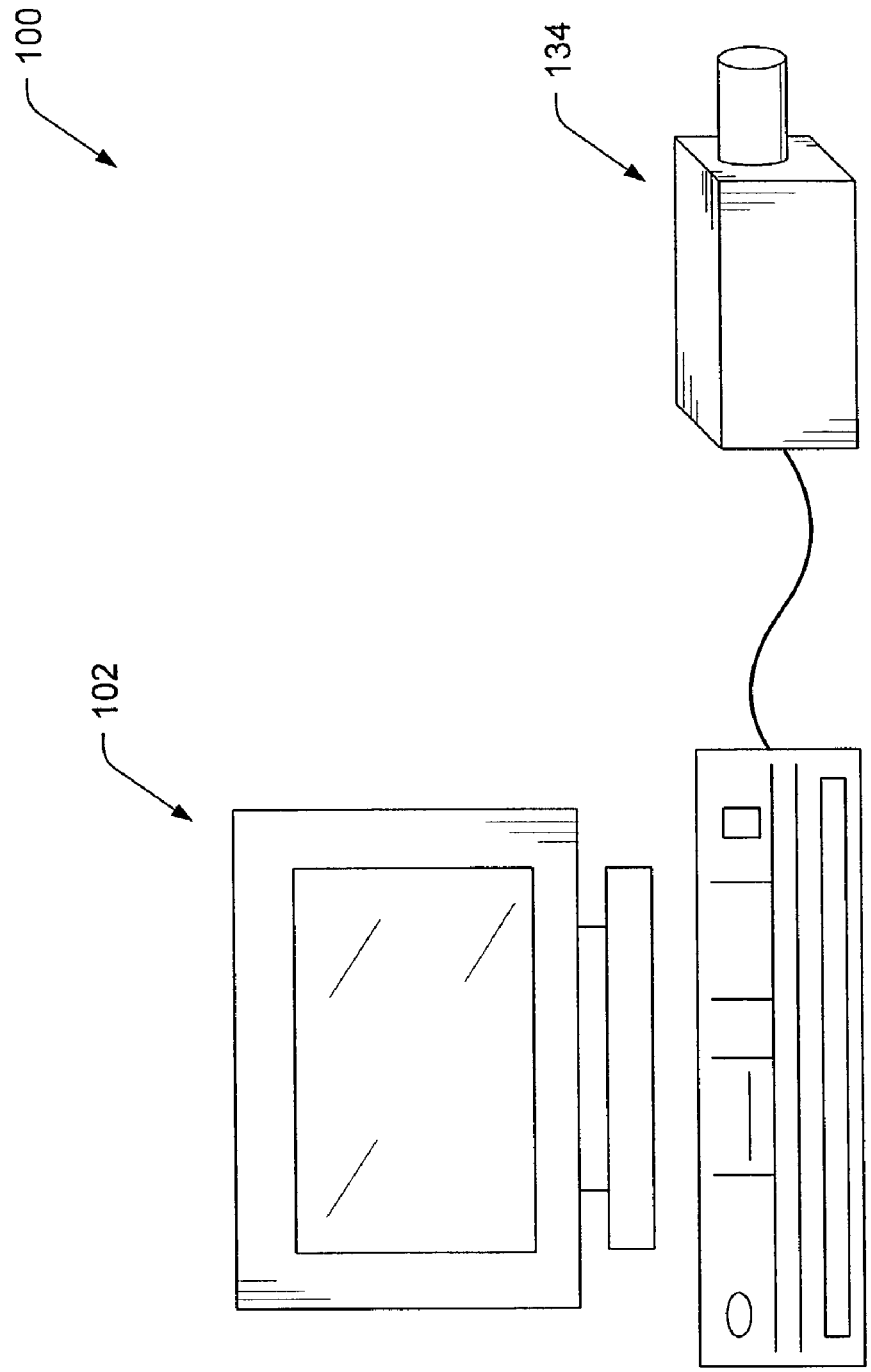
FIG. 1 illustrates an image acquisition/machine vision system according to one embodiment of the invention.

While the invention is susceptible to various modifications and alternative forms, specific embodiments are shown by way of example in the drawings and will herein be described in detail. It should be understood, however, that drawings and detailed description thereto are not intended to limit the invention to the particular form disclosed. Instead, the invention is to cover all modifications, equivalents and alternative following within the spirit and scope of the present invention as defined by the appended claims.

DETAILED DESCRIPTION OF THE EMBODIMENT

Incorporation by Reference

The following U.S. Patents and patent applications are hereby incorporated by reference in their entirety as though fully and completely set forth herein.

U.S. Pat. No. 4,914,568 titled "Graphical System for Modeling a Process and Associated Method," filed on Oct. 24, 1986, whose inventors are Jeffrey L. Kodosky, James J. Truchard, and John E. MacCrisken.

U.S. Pat. No. 6,219,628 titled "System and Method for Configuring an Instrument to Perform Measurement Functions Utilizing Conversion of Graphical Programs into Hardware Implementations," filed on Aug. 18, 1997, whose inventors are Jeffrey L. Kodosky, Hugo Andrade, Brian K. Odom, and Cary P. Butler.

U.S. Pat. No. 6,173,438 titled "Embedded Graphical Programming System," filed Aug. 18, 1997, whose inventors are Jeffrey L. Kodosky, Darshan Shah, Samson DeKey, and Steve Rogers.

U.S. patent application Ser. No. 09/949,783 titled "System and Method for Deploying a Graphical Program on an Image Acquisition Device," filed on Sep. 10, 2001, whose inventors are Kevin L. Schultz, Jeffrey L. Kodosky, Hugo Andrade, Brian Keith Odom and Cary Paul Butler.

Figure 2A:
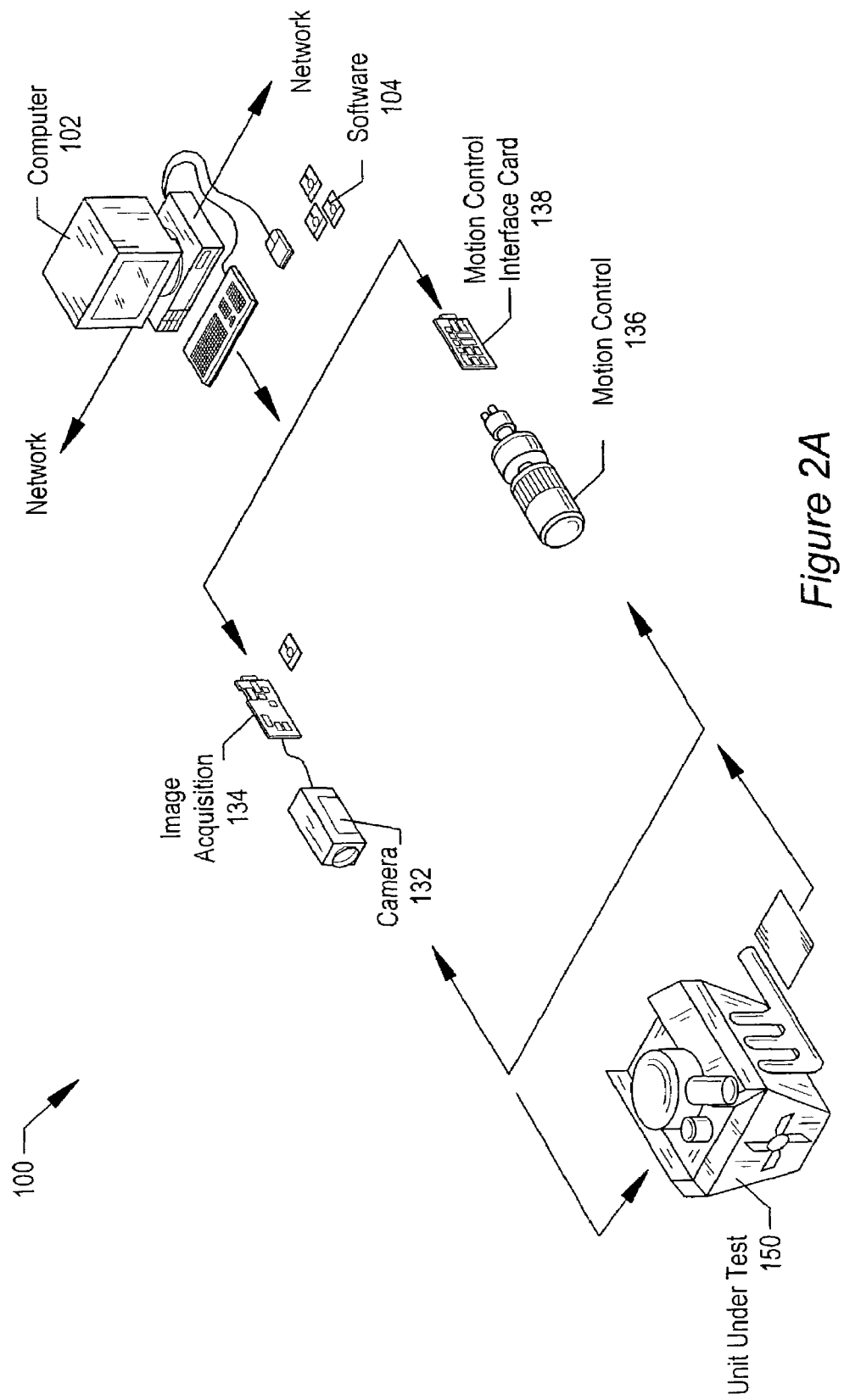
FIG. 2A illustrates a computer system coupled to an image acquisition device according to one embodiment of the invention.
Figure 2B:
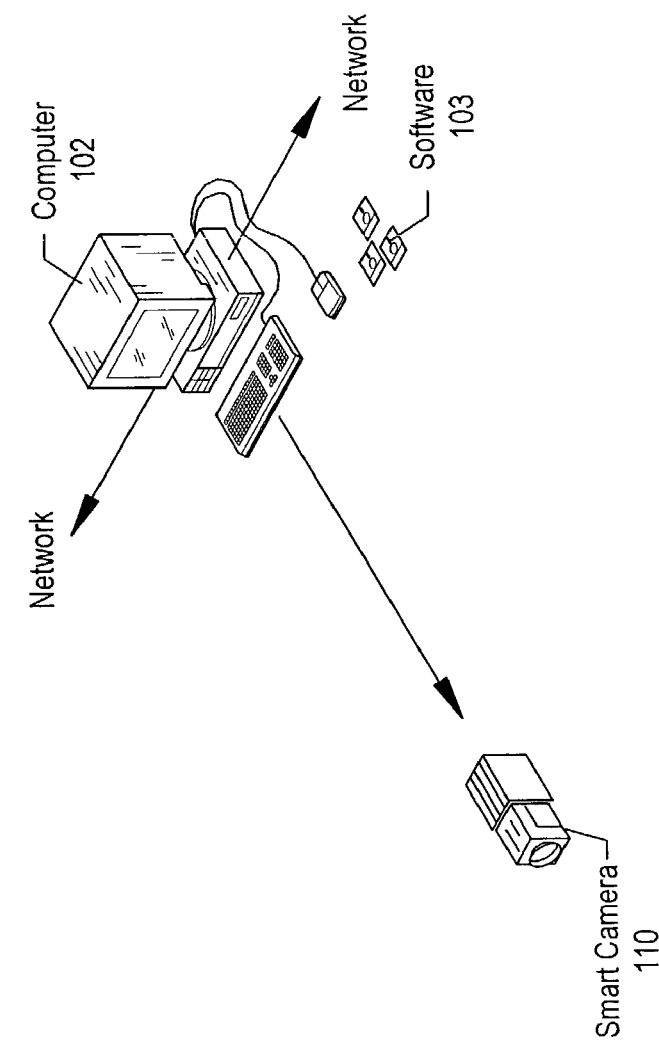
FIG. 2B illustrates a computer system coupled to a smart camera according to one embodiment of the invention.
Figure 2B:
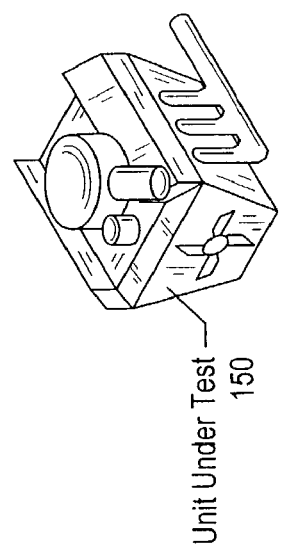

FIGS. 1-2B—Image Acquisition or Machine Vision Systems

FIG. 1 illustrates an exemplary image acquisition or machine vision system 100. In FIG. 1, a host computer system 102 is coupled to an image acquisition device 134. As used herein, the term "image acquisition device" is intended to include any of various types of devices that are operable to acquire and/or store an image. Some image acquisition devices may also be operable to analyze or process an acquired or stored image. Examples of an image acquisition device include an internal image acquisition (or machine vision) card (also called a video capture board) that is included within a computer, a device external to a computer that operates similarly to an image acquisition card, a smart camera, a robot having machine vision, and other similar types of devices.

As used herein, the terms "image processing" and "machine vision" are used interchangeably to refer to the processing of images to extract useful information from the image or determine characteristics of the image (or to determine characteristics of one or more objects displayed in the image). The term "image processing" is used herein to refer to both "image processing" and "machine vision," to the extent these terms have different meanings. The term "image processing function" refers to functions such as edge detection, blob analysis, pattern matching, and other image processing functions. The term "image processing function" may also include an operation or decision that is performed in response to the information extracted or characteristics determined from the image. The term "image processing function" is also intended to include an image processing (or machine vision) algorithm that combines a sequence of two or more image processing functions or tools and/or decision operations that process an image in a desired way or which implement an image processing or machine vision application, such as part inspection, automated assembly, image analysis, pattern matching, edge detection, etc.

FIG. 2A shows another embodiment of an exemplary image acquisition or machine vision system 100. Like FIG. 1, FIG. 2A shows a host computer system 102 coupled to an image acquisition device 134. As FIG. 2A shows, the image acquisition device 134 may in tarn couple to a camera 132. Note that in other embodiments (such as those illustrated in FIGS. 1 and 2B), the image acquisition device 134 may include a camera. The image acquisition device 134 may include a functional unit for performing one or more image processing functions as described above. Such a functional unit may also perform an image display function. For example, the functional unit may execute and/or be configured according to a graphical program that includes a display node. Execution of the display node may operate to transfer an image acquired by the image acquisition device 134 to a display device and to display the transferred image on the display device. The display device may be included in the same computer system as the image acquisition device 134 in some embodiments. In other embodiments, the display device may be coupled to the image acquisition device via a network, and execution of the display node may operate to transfer the image over the network.

The display node may be a node included in a graphical programming system that a programmer may select when creating a graphical program. In non-graphical programming embodiments, the display node may be a subroutine (e.g., included in a library of subroutines) implemented in a text-based programming system. Thus, a programmer may simply and efficiently program a device to transfer an image to be displayed on a remote device by selecting the display node within the graphical programming environment or by including a subroutine call to the subroutine implementing the display node in a text-based programming system. Furthermore, in some embodiments, the same display node may be selected regardless of whether the device that will execute the display node includes desired display capabilities or not. For example, a user may select the same display node for inclusion in a graphical program that will be executed on a host computer system and for inclusion in a graphical program that will be executed on an embedded image acquisition device that does not include a display.

The host computer 102 may include a CPU, a display screen, memory, and one or more input devices such as a mouse or keyboard as shown. The computer 102 may operate with the image acquisition device to analyze, measure or control a device or process 150. Alternatively, the computer 102 may be used only to configure a functional unit in the image acquisition device 134.

As used herein, the term "functional unit" may include a processor and memory and/or a programmable hardware element. The term "functional unit" may include one or more processors and memories and/or one or more programmable hardware elements. As used herein, the term "processor" is intended to include any of types of processors, CPUs, microcontrollers, or other devices capable of executing software instructions. The term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

As shown in FIG. 2A, a video device or camera 132 may be coupled to the computer 102 via the image acquisition device or card 134. The camera 132 and/or image acquisition device 134 may coupled to the computer 102 through a serial bus, such as a USB (Universal Serial Bus) or IEEE 1394 (also known as FireWire) bus, a network, or through other means. The image acquisition device 134 may not include a display capable of displaying images (e.g., images captured by camera 132) in many embodiments.

The image acquisition system 100 may be used in a manufacturing assembly, test, measurement, and/or control application, among others. For illustration purposes, a unit under test (UUT) 150 is shown which may be positioned by a motion control device 136 (and interface card 138), and imaged and analyzed by the camera 132 and image acquisition device 134. It is noted that in various other embodiments the UUT 150 may include a process or system to be measured and/or analyzed.

Referring again to FIG. 2A, the computer 102 may include a computer readable medium on which computer programs 104, e.g., graphical programs, according to the present invention may be stored. As used herein, the term "computer readable medium" includes a non-volatile medium, e.g., a magnetic media or hard disk, or optical storage; a volatile medium, such as computer system memory, e.g., random access memory (RAM) such as DRAM, SRAM, EDO RAM, RAMBUS RAM, DR DRAM, etc.; or an installation medium, such as a CD-ROM or floppy disks 104, on which the computer programs according to the present invention may be stored for loading into the computer system. The term "computer readable medium" may also include other types of memory or combinations thereof.

The computer readable medium may be included in the computer 102 where the programs are executed or may be located on a second computer that is coupled to the computer 102 through a network, such as a local area network (LAN), a wide area network (WAN), or the Internet. In such an instance, the second computer may operate to provide the program instructions through the network to the computer 102 for execution.

Some of the software programs of the present invention may be stored in a computer readable medium of the respective computer 102, or in a computer readable medium of another computer, and executed by the CPU. The CPU executing code and data from the computer readable medium thus includes a means for deploying a graphical program onto an image acquisition device, e.g., a smart camera, according to the steps described below.

The computer readable medium may store a graphical programming development system for developing graphical programs. The computer readable medium may also store one or more computer programs that are executable to deploy a graphical program. In some embodiments, programs that are executable to deploy a graphical program may do so by converting at least a portion of a graphical program into a form for configuring or programming a programmable hardware element, by executing the graphical program natively on a processor, or by converting the graphical program to a different form for execution by a processor and memory. The image acquisition device 134 in FIG. 1 may be controlled by or configured by graphical software programs that are deployed to the functional unit on the device 134.

The graphical program may be deployed by either one or more of: 1) converting the graphical program (or a portion thereof) into a hardware implementation and configuring the programmable hardware element with this hardware implementation, 2) transferring the graphical program (or a portion thereof) to a memory of the functional unit for execution by a processor (where the processor may execute a graphical program execution engine and optionally a real time operating system), or 3) compiling the graphical program (or a portion thereof) into an executable program and transferring the executable program to a memory of the functional unit for execution by a processor (where the processor may optionally execute a real time operating system).

In the present application, the term "graphical program" or "block diagram" is intended to include a program including graphical code, e.g., two or more nodes interconnected in one or more of a data flow, control flow, or execution flow format, where the interconnected nodes visually indicate the functionality of the program. Thus, the terms "graphical program" or "block diagram" are each intended to include a program including several interconnected nodes that visually indicate the functionality of the program. A graphical program may include a block diagram and may also include a user interface portion or front panel portion. The user interface portion may be contained in the block diagram or may be contained in one or more separate panels or windows. A graphical program may be created using any of various types of systems which are used to develop or create graphical code or graphical programs, including LabVIEW, BridgeVIEW, DASYLab, and DiaDem from National Instruments, Visual Designer from Intelligent Instrumentation, Agilent VEE (Visual Engineering Environment), SnapMaster by HEM Data Corporation, SoftWIRE from Measurement Computing, ObjectBench by SES (Scientific and Engineering Software), Simulink from the MathWorks, WiT from Coreco, Vision Program Manager from PPT Vision, Hypersignal, VisiDAQ, VisSim, Truly Visual, and Khoros, among others. In the preferred embodiment, the system uses the LabVIEW graphical programming system available from National Instruments.

FIG. 2B illustrates an image acquisition system with a smart camera 110. A smart camera may include a housing that encloses a portion or all of the smart camera components, or may be included on a frame that primarily provides structural support for the smart camera components. In FIG. 2B, an image acquisition system includes computer system 102 and a smart camera 110. The smart camera 110 is an example of an image acquisition device 132. As used herein, the term "smart camera" is intended to include any of various types of devices that include a camera or other image sensor and a functional unit capable of being configured to perform an image processing function to analyze or process an acquired image. For example, while traditional computer vision is based on a camera/computer system in which the image processing or understanding algorithm is embedded in the computer 102, the computational load of vision algorithms may be circumvented or mitigated by merging low-level processing with the camera or sensor in a single module. For example, a hardware architecture may be defined in a Hardware Description Language (e.g., VHDL), simulated and synthesized into digital structures that can then be configured in a Field Programmable Gate Array (FPGA). Examples of smart cameras include: NAVSYS Corporation's GI-EYE, which generates digital image data that are automatically tagged with geo-registration metadata to indicate the precise position and attitude of the camera when the image was taken; Vision Components' GmbH Smart Machine Vision Cameras, which integrate a high-resolution Charge Coupled Device (CCD) sensor with a fast image-processing signal processor and provide various interfaces to allow communication with the outside world; and Visual Inspection Systems' SMART cameras with on-board DSP capabilities, including frame grabbers and robot guidance systems, among others.

The computer system 102 shown in FIG. 2B may include a computer readable medium. As noted above, the computer readable medium may store a graphical programming development system for developing graphical programs. The graphical programming development system may be used to develop a graphical program that controls display of an image acquired by an image acquisition device. In this example, one or more of the nodes in the graphical program may implement or represent an image display function.

The computer readable medium may also store one or more computer programs that are executable to convert at least a portion of a graphical program into a form for configuring a functional unit included in the smart camera 110.

As mentioned above, the smart camera 110 may include a functional unit, which may include a programmable hardware element (programmable or reconfigurable hardware), e.g., an FPGA, and/or a processor and memory. The functional unit in the smart camera 110 may be configured with a graphical program that implements an image display function. The smart camera 110 may also include a camera coupled to the functional unit. The smart camera 110 may also include a memory (a computer readable medium) coupled to the camera that stores an acquired image. If the smart camera 110 includes an analog camera, the smart camera 110 may further include analog to digital (A/D) logic for converting analog image signals into a digital image for storage in the memory. The smart camera 110 may also optionally include timer/counter logic that may perform timing/counting operations, e.g., during operation of the functional unit. In one embodiment, the smart camera may include a "PC-on-a-Card" which may provide some or all of the functionality of a personal computer. As FIG. 2B shows, in one embodiment, the smart camera may include a housing that encloses some or all of the components of the smart camera.

Figure 3A:
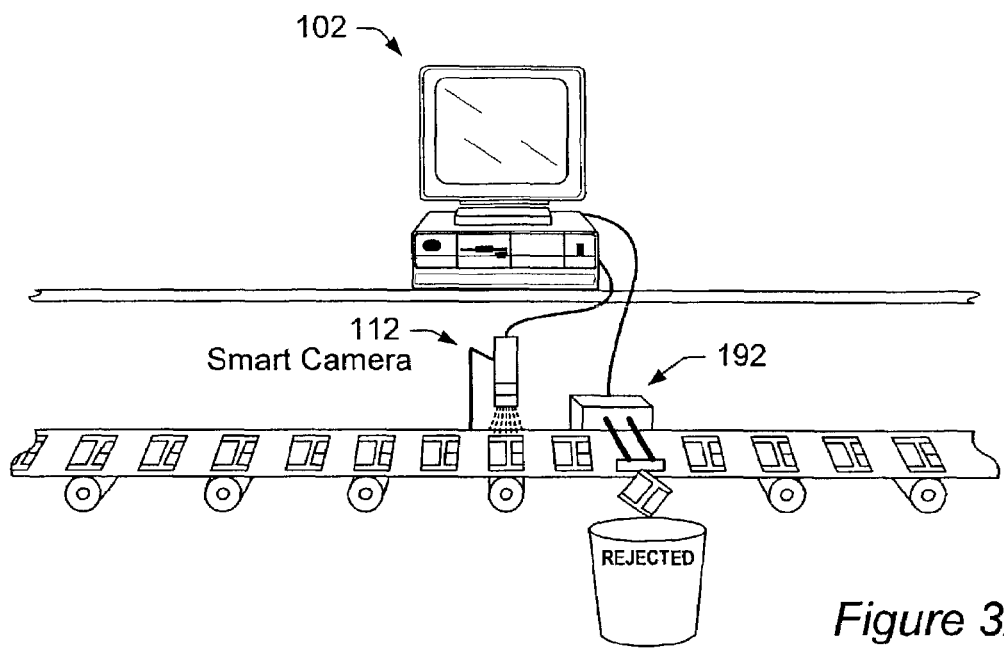
FIGS. 3A and 3B illustrate image processing/machine vision systems according to embodiments of the invention.
Figure 3B:
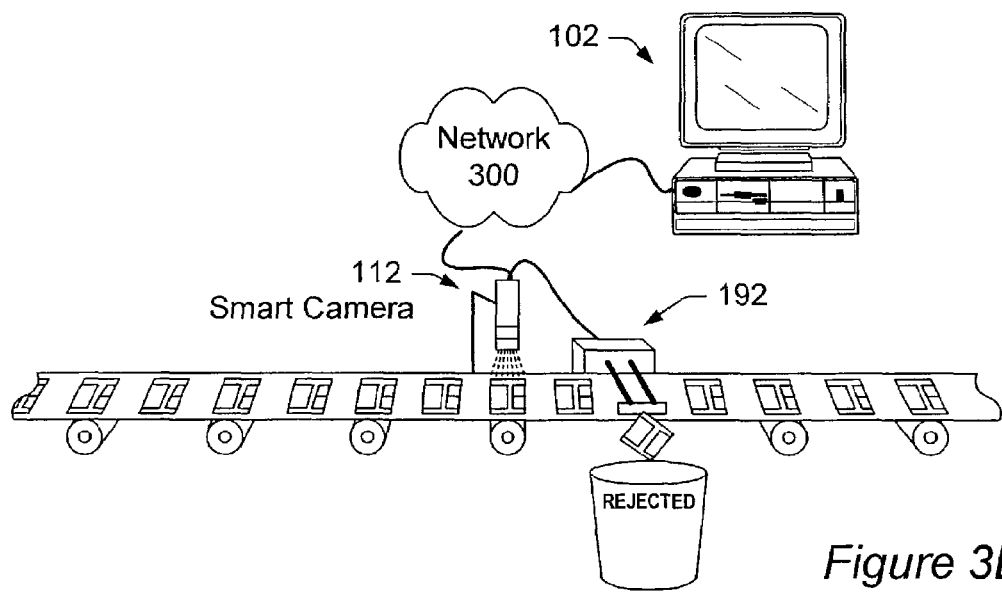

FIGS. 3A and 3B—Image Processing Systems

FIGS. 3A and 3B illustrate image processing or machine vision systems according to various embodiments of the invention. The image processing system of FIG. 3A may include a computer 102 and a smart camera 110, and may also include a motion control device 136. The image processing system of FIG. 3B may include smart camera 110 and motion control device 136, and may not include computer system 102. However, the image processing system of FIG. 3B may be coupled to a computer system such as computer system 102 by a network 300 such as the Internet or a WAN or LAN.

The smart camera 110 may include a digital camera that acquires a digital video signal that includes an image, or a sequence of images, or other data desired to be acquired. In an alternative embodiment, the smart camera 110 may instead include an analog camera that acquires an analog video signal, and the smart camera 110 may further include A/D converters for converting the analog video signal into a digital image. The smart camera 110 may include a functional unit configured according to a graphical program. For example, a graphical program may have been first created to perform desired functions, e.g., using a graphical development environment on the computer system 102, and the graphical program may then have been deployed onto the functional unit of the smart camera to implement all or some of the desired functions.

In the machine vision system of FIG. 3A, the digital video signal or digital image may be provided to the functional unit where the image processing function is performed in the smart camera 110.

In the embodiment of FIG. 3A, the functional unit in the smart camera 110 may process the image to determine characteristics of the image, and the computer 102 may then perform an operation based on this result, such as rejecting a part from an assembly line or logging the results to file. As another example, the functional unit in the smart camera 110 may process the image to determine characteristics of the image, and may optionally perform an operation based on this result. The computer system 102 may execute software to provide a user interface for the system, e.g., the computer system 102 may execute a user interface portion of a graphical program, where the block diagram of the graphical program is used to configure the functional unit in the smart camera 110. Thus, a first portion of a graphical program, e.g., DSP functions requiring real time performance, may be executed by the smart camera, and a second portion of the graphical program, e.g., a user interface where real time performance is not required, may be executed by the computer system 102.

In the embodiment of FIG. 3B, the functional unit in the smart camera 110 (instead of computer system 102) may optionally perform an operation based on determined characteristics of the image. FIG. 3B also illustrates how the smart camera 110 may be coupled to the computer system 102 via a network 300.

In the embodiments of FIGS. 3A and 3B, a functional unit in the smart camera 110 (or the computer system 102 in FIG. 3A) may control the motion control device 136. In an alternative embodiment, the motion control device 136 may also include a functional unit that has been configured with a graphical program. The functional unit in the motion control device 136 may be configured to perform a motion control function. Thus, a graphical program may have been first created that performs the motion control function, and the graphical program may then have been deployed onto the motion control device 136 as described herein. Examples of motion control functions include moving a part or object to be imaged by a camera, rejecting a part on an assembly line, or placing or affixing components on a part being assembled, or a robotics application, among others.

Additionally, the smart camera 110 may be configured with a program (e.g., a graphical program) that controls display of one or more images acquired by the smart camera 110. Execution of the program may transfer an image from the smart camera 110 to a display device included in computer system 102 or another system and cause the transferred image to be displayed on that display device.

Figure 4:
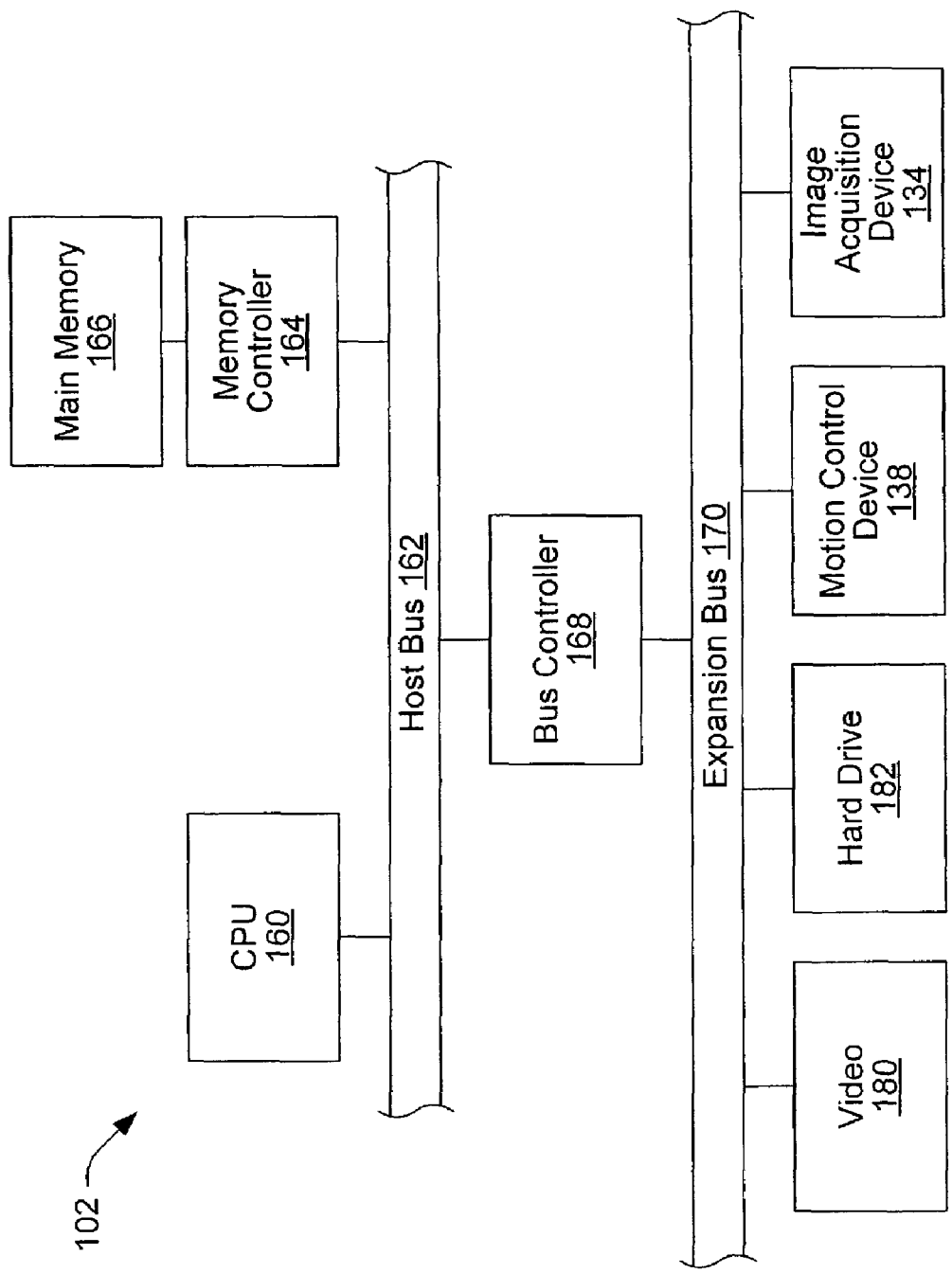
FIG. 4 is a block diagram of the computer system of FIGS. 1-3B.

FIG. 4—Computer Block Diagram

FIG. 4 is an exemplary block diagram of the computer 102 of FIGS. 1-3B. The elements of a computer not necessary to understand the operation of the present invention have been omitted for simplicity. The computer 102 may include at least one central processing unit (CPU) or processor 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 stores a graphical programming system and software for deploying at least a portion of a graphical program onto an image acquisition device 134. This software will be discussed in more detail below. The main memory 166 may also store operating system software, i.e., software for operation of the computer system, as well as one or more application programs, as is well known to those skilled in the art.

The host bus 162 is coupled to an expansion or input/output bus 170 by means of a bus controller 168 or bus bridge logic. The expansion bus 170 may be a PCI (Peripheral Component Interconnect) expansion bus, although other bus types may be used. The expansion bus 170 may include slots for various devices, the examples shown including a motion control interface card 138 and an image acquisition device 134, as described above in reference to FIG. 1. The computer 102 may further include a video display subsystem 180 and hard drive 182 coupled to the expansion bus 170, also shown.

One or more of the interface cards or devices (e.g., those shown in FIGS. 1-3B) may be coupled to or included in the computer 102 and may include a functional unit, such as a programmable hardware element (e.g., an FPGA), a processor, and/or memory. The computer 102 may also include a network interface for coupling to a network 300. Note that in such embodiments, an image acquisition device 134 may be coupled to the computer 102 by the network (e.g., Ethernet) instead of being included within the computer 102.

Note that an image acquisition device having a functional unit may be internal or external to the computer 102 and may be connected to the computer through a network such as the Internet.

Figure 5:
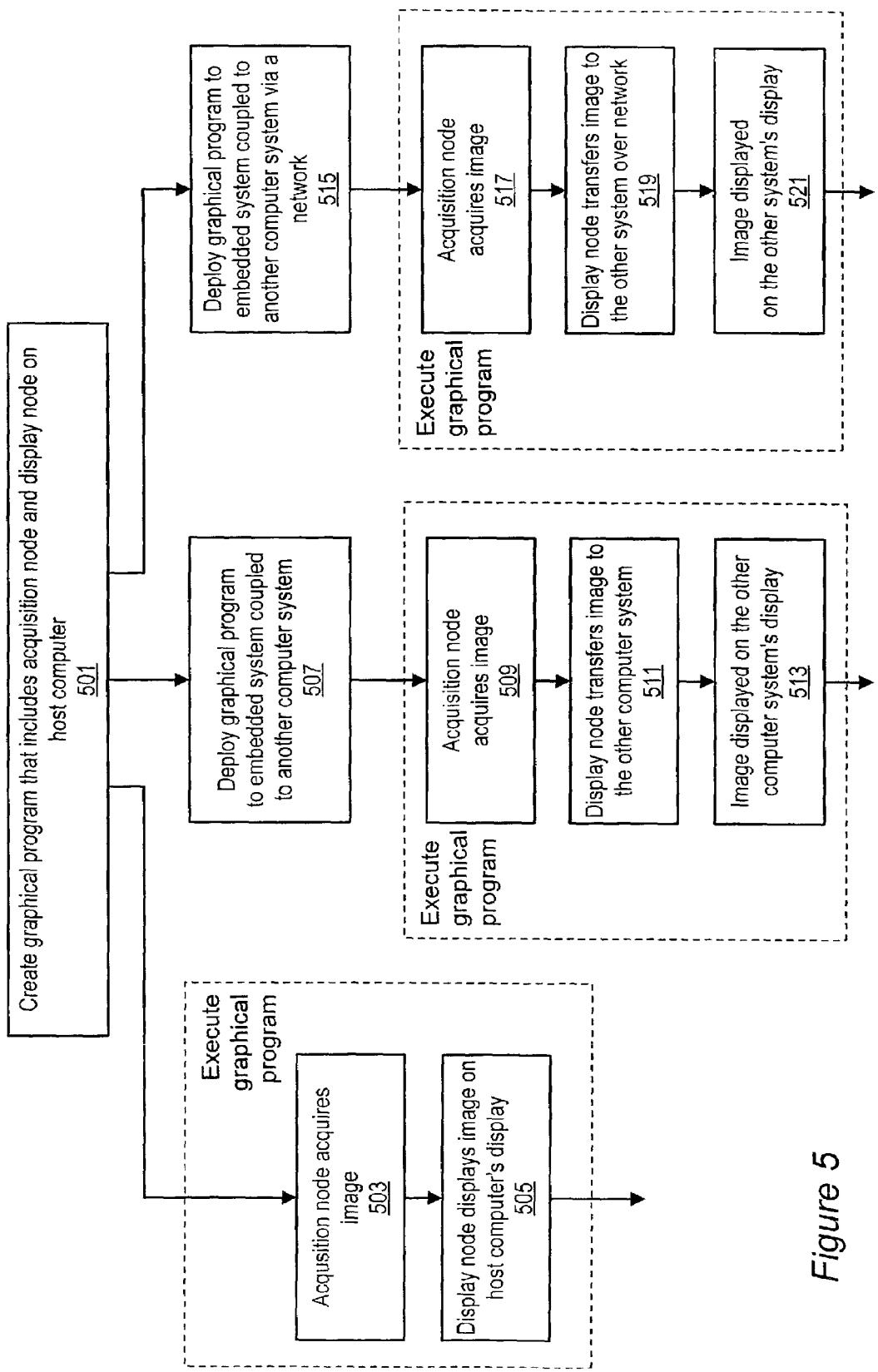
FIG. 5 illustrates an exemplary packet that may be transferred by execution of a display node in a graphical program, according to one embodiment.

FIG. 5—Method for Using a Display Node to Display an Acquired Image

FIG. 5 is a flowchart illustrating one embodiment of a method for using a display node to cause an embedded network device to transfer and display an acquired image on a remote display. The embedded network device may include an image acquisition device as described above.

At 501, a graphical program may be created. The graphical program may include an image acquisition node and a display node. The graphical program may be created in response to user input (e.g., in response to a user selecting icons representing the display node and the acquisition node and arranging the icons via a display device coupled to the user's workstation). Creation of the graphical program may involve storing the created graphical program in a memory device. Note that the functionality of the image acquisition node and/or the display node may, in alternative embodiments, be implemented in a text-based programmning language (e.g., one or both may be implemented as a subroutine included in a library of subroutines selectable by a user).

The graphical program may be executed by a variety of different devices included in a variety of different systems. For example, the graphical program may be deployed to a device that does not include its own display, as indicated at 507 and 515. The device may be coupled directly to a host computer (e.g., by an IEEE 1394 or USB bus), as indicated at 507, or indirectly coupled to the host computer by a network, as indicated at 515. If the graphical program is executed by an embedded system (e.g., an image acquisition device such as a smart camera) that lacks a display device, execution of the graphical program may cause the embedded system to acquire an image at 509 and 517 respectively, transfer the image to another system that includes a display at 511 and 519 respectively, and display the image on that display, at 513 and 521 respectively. For example, one or more embedded systems may be distributed across a networked environment. Each of the embedded systems may execute the graphical program. Execution of the display node may operate to transfer an image acquired by an embedded system on which the display node is executing to a networked display device, as shown at 519. When executed, the display node may automatically detect whether the embedded system on which it is executing has its own display device, whether the embedded system is coupled to a display device by a network, or whether no display device is included within the networked system. If no display device is included within the networked system, execution of the display node may not perform any function.

The display node may allow a user to program an embedded system to transfer an acquired image to a networked display device without requiring the user to generate code for the network transfer involved. Thus, providing the display node within a graphical programming environment may greatly simplify programming of an image acquisition device to remotely display an acquired image.

In some embodiments, the same display node used to transfer and display an acquired image when executed on an image acquisition device that lacks a display may also be executed on a device that includes display capabilities (e.g., a processor within a computer system that includes an image acquisition card). For example, if the graphical program is executed by a functional unit (e.g., a CPU) included in a system that has its own display device, as shown at 503-505, execution of the graphical program may acquire an image and display the image on the display device included within that system. Execution of the display node may automatically detect whether the display node is executing in a system that has its own display device in some embodiments. Note that in such embodiments, a portion of the graphical program (e.g., the image acquisition node) may be executed by one device (e.g., a functional unit on the image acquisition card) while the display node may be executed by a different device such as one of the computer system's processors.

In some embodiments, execution of the display node on a device that both lacks a display device and is not coupled to a system that includes a display device may perform no function (not shown). Accordingly, inclusion of such a display node in a graphical program may further simplify programming by allowing a programmer to include the display node without regard to whether the resulting program will execute on an device that includes a display or not.

Thus, the same display node may be used to program a variety of different devices in some embodiments. In such embodiments, execution of the display node automatically detect whether it is executing on a device that has its own display and whether the device is coupled to a system that has its own display. For example, the display node may detect that it is executing on an image acquisition card coupled to a PCI bus within a computer system. Based on the type of device the display node is executing on, the display node may operate to transfer an image, if needed, and display the image on a display device. For example, execution of the display node on the image acquisition card coupled to the PCI bus in a computer system may operate to display an acquired image on the display device included in that computer system. In one embodiment, for example, execution of the display node may transfer and display the image by generating an interrupt and/or controlling DMA-type transfers used to move the image from memory local to the image acquisition device into a frame buffer type memory included in a computer system.

During execution, the display node may be configured to automatically detect whether it is executing on an embedded network system, and if so, to transfer the image across the network to a remote computer system. That remote computer system then displays the image. If display node detects that the embedded machine or the remote network node on which it is executing is not connected to the network, the display node does nothing. When the machines are reconnected to the network, the executing display node may automatically detect the presence of a device having a display attached to the network and operate to transfer an image to that device over the network. If the display node is executing on a device that has suitable display capabilities, the display node may operate to display the image on that device instead of transferring the image to another device.

Automatically detecting whether the device on which the display node is executing may allow the display node to handle situations in which the device is disconnected and reconnected to a network. For example, if the network connection is lost, the display node may detect that the device is no longer coupled to a system having a display device by a network. Accordingly, the display node may perform no transferring and displaying functions. If the network connection is reestablished, the display node may detect the change in network status and operate to transfer images over the network for display on a networked display device.

Note that in other embodiments, a display node may be configured for use in a single type of environment. For example, a different display node may be used to program an embedded device that lacks a display than is used to program a device that includes a display. In such embodiments, execution of the display node may not necessarily detect what type of environment it is executing in.

In embodiments where the display node operates to transfer images over a network, the display node may be configured to use any of a variety of different network protocols to transfer the image. For example, TCP/IP (Transmission Control Protocol/Internet Protocol), RPC (Remote Procedure Call), UDP (User Datagram Protocol), and HTTP (Hyper Text Transfer Protocol) protocols may be used in some embodiments.

In various embodiments where the image is transferred (e.g., over a network or over a bus), the display node may compress (e.g., according to JPEG (Joint Photographic Experts Group), PNG (Portable Network Graphics), or proprietary compression schemes) the image before transfer. In some embodiments, the display node may include several options allowing a programmer to select whether images should be compressed before transfer (assuming the images are not already in compressed form). When executed, the display node may compress the image (if compression is selected by the user) before transfer. The display node may also operate to decompress the image before display on the remote device. Other display node options may allow a programmer to select whether image pixels are juxtaposed (e.g., to facilitate faster transfer) before transfer.

Figure 6:
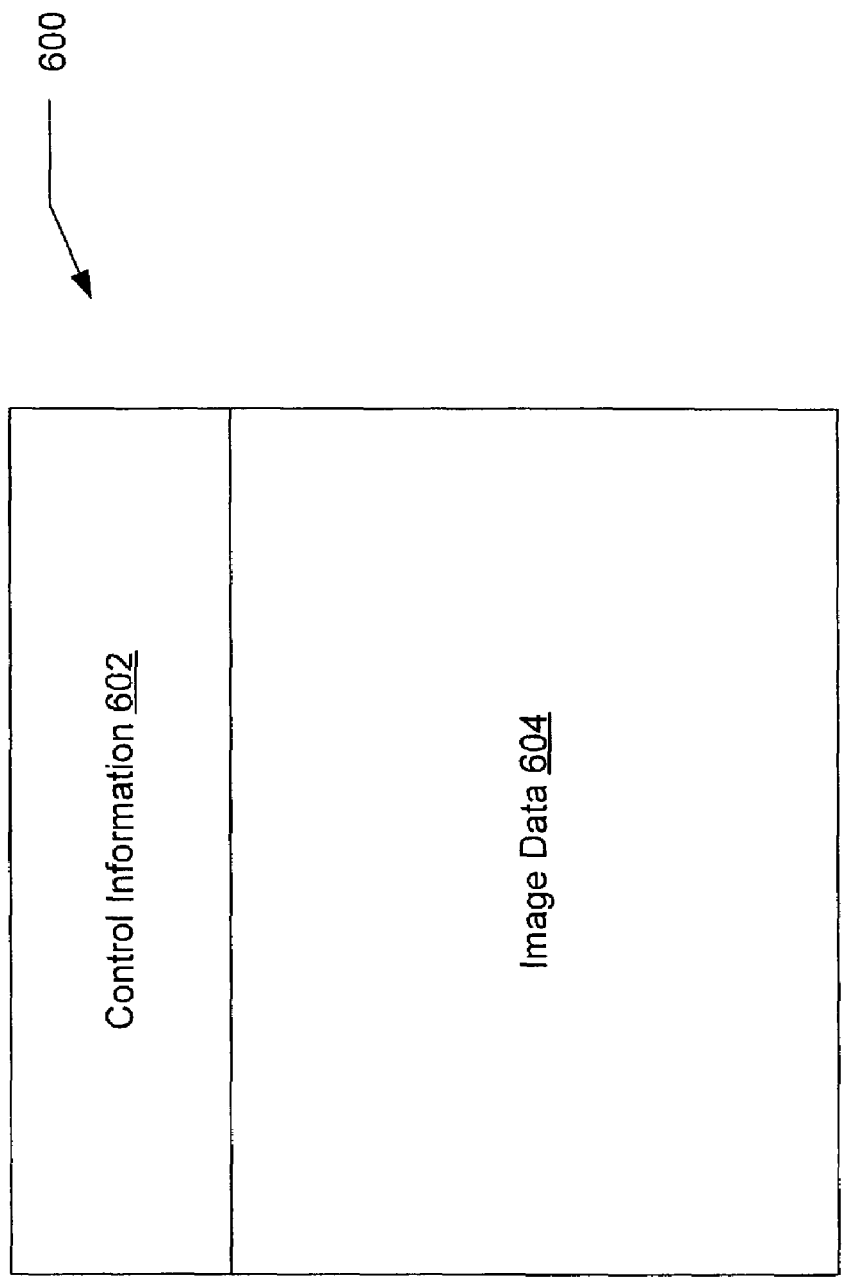
FIG. 6 is a flowchart of one embodiment of a method of operating an embedded device configured according to a graphical program that includes a display node.

In addition to transferring an image for display, execution of the display node may operate to transfer additional information associated with the image. This additional information may include control information regarding how the image is to be displayed and/or information that allows a user to interact with the image as it is displayed. For example, FIG. 6 illustrates an exemplary packet 600 that may be transferred by the display node in some embodiments. As shown, such a packet may include control information 602 and image data 604. Image data 604 may include various types of data, including pixels and/or graphics primitives, such as geometrical shapes and textures, making up a particular image.

Control information 602 may include various other information. For example, the display node may operate to transfer display options like window size and position to the system that includes the display device. Elements like regions of interest, overlays, and is palettes may be transferred and displayed in addition to the image. For example, the display node may also transfer information about the image, such as non-destructive overlay information to display, origin information (e.g., identifying an origin within a coordinate system corresponding to a viewable portion of a display device), orientation information, information identifying which camera was used to acquire the image, a time stamp identifying a time at which the image was acquired, etc.

The display node may also operate to retrieve a region of interest from a user, allowing the user to interact with the display. In response to receiving the user-specified region of interest, the display node may operate to responsively update the local region of interest. The display node may also operate to poll the client workstation for the last event (e.g., clicking or movement of a mouse, etc.) on the user's window. This polled information may be used to control the flow of the display node's execution (e.g., by controlling when the next image is transferred and/or displayed or by controlling which images are transferred and/or displayed). The display node may also operate to display tools that can be used in conjunction with the user's display window.

Images may be transferred directly to/from the user's system clipboard in response to selection of certain tools in some embodiments.

In one embodiment, a display node may be configured to respond to the all or some of the following commands: WindSetup; WindShow; WindClose; WindMove; WindSize; WindDraw; WindZoom; WindROIColor; WindSetROI; WindGetROI; WindEraseROI; ConstructROI; WindConversionPolicy; WindGetLastEvent; WindToolsSetup; WindToolsShow; WindToolsClose; WindToolsMove; WindToolsSelect; WindToolsContext; ImageToClipboard; and/or ClipboardToimage. Each command may be received from either or both the image acquisition device that acquires the image and a client workstation on which the image is being displayed.

The WindSetup command may cause the display node to configure the default (or specified) window options for display of an image. The display node may do this by setting up a window title, one or more window scrollbars, and/or other window properties such as frame and/or background color, window size, etc. In response to the WindShow command, the display node may show a default or specified window. Similarly, in response to the WindClose command, the display node may close the default or specified window. The WindMove command may facilitate moving a default or specified window to default or specified screen coordinates. The WindSize command may be used to configure and/or adjust a window to a default or specified window size. The WindDraw command may be used to draw an image to a default or specified window. The WindZoom command may be used to zoom in or out the image in a default or specified window.

Several commands may relate to a user-specified region of interest (ROI) within a particular window. For example, the WindROIColor may be used to set the default color used for drawing regions of interest to a default or specified window. WindSetROI may be used to set the region of interest in a default or specified window. WindGetROI may be used to get the region of interest in a default or specified window. WindEraseROI may be used to remove a region of interest in a default or specified) window. ConstructROI may cause the display node to prompt the user for a region of interest with an interactive dialog.

WindConversionPolicy may cause a display node to set options for image conversion in the default (or specified) window. WindGetLastEvent may be used to poll the default (or specified) window for the last occurring action and its location. Other information may also be returned in response to the WindGetLastEvent command. WindToolsSetup may be used to set the available tools for the floating tools dialog. WindToolsShow may be used to show the floating tools dialog. WindToolsClose may similarly close the floating tools dialog. WindToolsMove may move the floating tools dialog. WindToolsSelect may select a tool from the floating tools dialog. WindToolsContext may set context sensitivity options for the floating tools dialog. ImageToClipboard may transfer an image to a user clipboard. ClipboardToImage may transfer an image from the clipboard to the display device.

Figure 7:
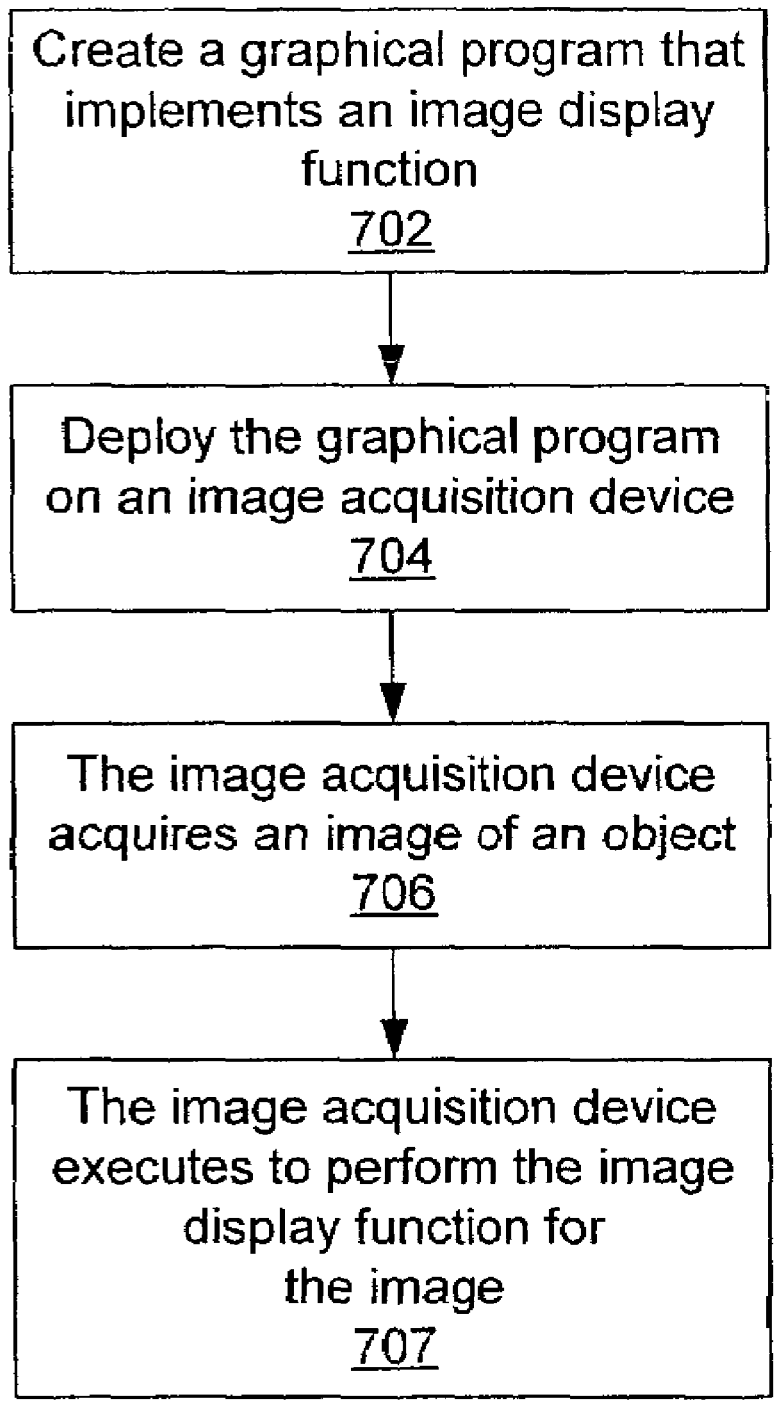
FIG. 7 is a flowchart diagram illustrating deployment of a graphical program on a device, according to one embodiment.

FIG. 7—Method for Deploying a Graphical Program on an Image Acquisition Device

FIG. 7 illustrates one embodiment of a method for deploying a graphical program on an embedded device to perform an image display function, where the image acquisition device includes a functional unit. Said another way, a computer-implemented method is presented for configuring an image acquisition device to perform an image display function using a graphical program. Note that the method shown in FIG. 7 may be used to configure any of the instruments or devices shown in FIGS. 1-4. It should be noted that in various embodiments, various functions in the method may occur concurrently, or in a different order than shown. Additionally, some functions may be omitted, or additional functions performed which are not shown, as desired. As shown, this method may operate as follows.

In step 702 a graphical program may be created that implements an image display function as described above. In the preferred embodiment, the graphical program is created on the computer system 102, although in other embodiments the graphical program may be created on a different computer system, for example, coupled to computer system 102 over a network. The graphical program may be created or assembled by the user with a graphical programming environment, such as the LabVIEW graphical programming development environment. In an alternate embodiment, the graphical program may be created in step 702 by the user specifying one or more functions or tasks, after which the specification may be analyzed and the graphical program generated automatically or programmatically from the specification. For example, the user may use a prototyping environment to create a script or prototype representing an image display function, and then a graphical program may be manually or programmatically created based on this prototype. It is noted that other approaches may also be used to create the graphical program, either manually by the user, or programmatically by software.

In step 704 the graphical program may be deployed on the image acquisition device 134. Note that in the preferred embodiment, the image acquisition device 134 is coupled to the computer system 102 to facilitate the deployment of the graphical program. In one embodiment, the image acquisition device 134 may be included in the computer system 102. In other embodiments the image acquisition device 134 may be coupled to the computer system 102 through a network, such as the Internet, or may be coupled to the computer system 102 through wireless means. In another embodiment, a human user may manually retrieve the graphical program from the computer 102 and load the graphical program onto the image acquisition device 134. As described in more detail below, deploying the graphical program on the image acquisition device 134 may include storing the graphical program on (at least part of) the functional unit, or configuring the functional unit with all or part of the graphical program, such that after the deployment, the functional unit is operable to execute or implement the functionality of the graphical program.

In step 706, the image acquisition device 134 may acquire an image of an object, such as, for example, the UUT 150, or an element or state of a system or process. In the preferred embodiment, the image is acquired via camera 132, although in other embodiments the image may be acquired from an external system, such as a computer or another image acquisition device. In one embodiment, the image acquisition device 134 may receive an image present signal, and acquire the image of the object in response to receiving the image present signal. In one embodiment, the image acquisition device may be coupled to a camera, and the image acquisition device acquiring an image of the object may include the camera acquiring the image of the object and the image acquisition device receiving and storing the image.

Finally, in step 708, the image acquisition device may execute to perform the image display function on the acquired image from 706. In other words, the functional unit on the image acquisition device 134 may execute all or part of the graphical program. For example, the image display function may operate to transfer the image to a display device, which may be included in another computer system coupled to the image acquisition device by a network, and to display the image on the display device.

In one embodiment, the image acquisition device 134 may include processor and memory. The deployment of the graphical program on the image acquisition device 134 described in 704 may then include transferring the graphical program to the memory on the image acquisition device 134.

In one embodiment, deploying the graphical program on the image acquisition device 134 may include generating an executable program (a machine language program) based on the graphical program, which implements the functionality of the graphical program, and transferring the executable program to the memory on the image acquisition device. In this embodiment, the image acquisition device executing to perform the image processing function on the image in 708 may include the processor in the image acquisition device 134 executing the executable program from the memory, possibly by executing a real time operating system (RTOS) from the memory. In the case where the executable program is generated from the graphical program, the image acquisition device executing to perform the image processing function on the image may include the processor in the image acquisition device executing the executable program (in executable form) from the memory.

In another embodiment, deploying the graphical program on the image acquisition device 134 may include transferring the graphical program in its native or original format to the memory on the image acquisition device. In this embodiment, the image acquisition device executing to perform the image processing function on the image in 708 may include the processor in the image acquisition device 134 executing a graphical program execution engine, and possibly a real time operating system (RTOS) from the memory.

In another embodiment, the image acquisition device may include a programmable hardware element, such as an FPGA. The deployment of the graphical program on the image acquisition device 134 described in 704 may then include generating a hardware description based on the graphical program, which describes a hardware implementation of the graphical program, and configuring the programmable hardware element in the image acquisition device 134 utilizing the hardware description. Configuring the programmable hardware element in the image acquisition device 134 utilizing the hardware description may include converting the hardware description, such as a VHDL file, into a netlist using available synthesis tools, and the compiling the netlist into a hardware program file (also called a software bit stream), which may be used to configure or program the programmable hardware element.

After configuring the programmable hardware element with the hardware description, the programmable hardware implements a hardware implementation of the graphical program. In this embodiment, the image acquisition device executing to perform the image processing function on the image in 708 may include the programmable hardware element in the image acquisition device executing to perform the image processing function on the image.

In yet another embodiment, the image acquisition device may include the processor, memory, and a programmable hardware element. The deployment of the graphical program on the image acquisition device 134 described in 704 may then include transferring a first portion of the graphical program to the memory on the image acquisition device 134 (either in native or compiled form), generating a hardware description based on a second portion of the graphical program describing a hardware implementation of the graphical program, and configuring the programmable hardware element in the image acquisition device utilizing the hardware description, after which the programmable hardware element implements a hardware implementation of the second portion of the graphical program.

In one embodiment, the image acquisition device may include a smart camera. In another embodiment, the image acquisition device may include an image acquisition board coupled to or included in a computer system.

Figure 8:
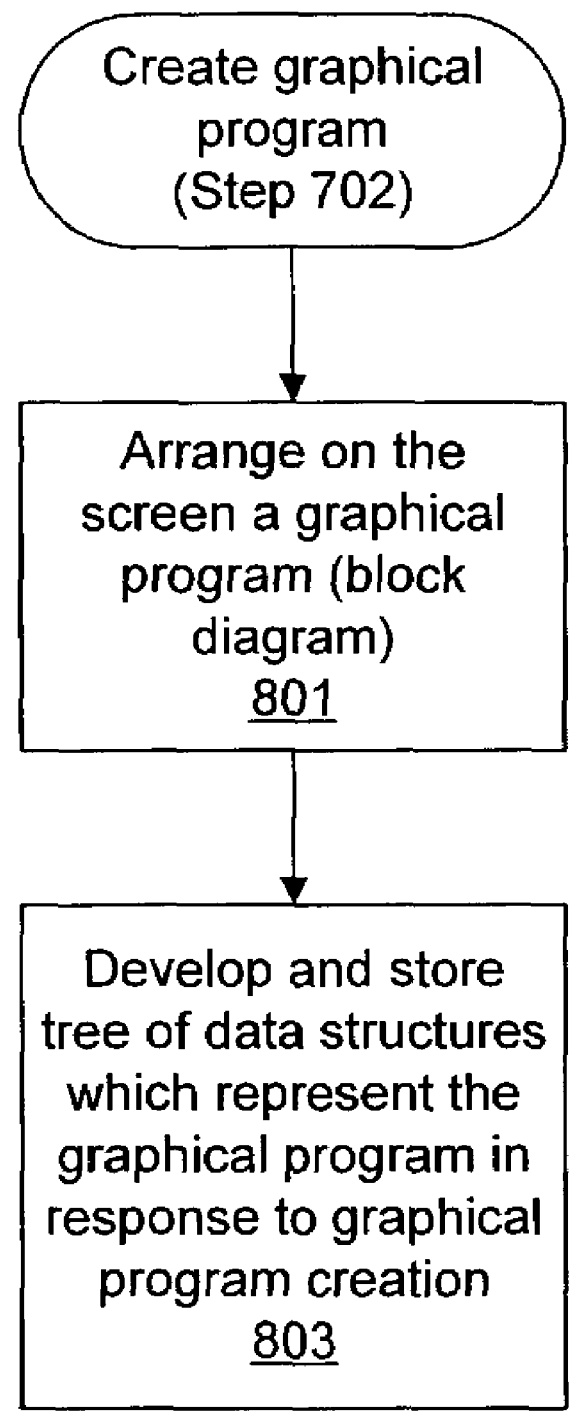
FIG. 8 is a flowchart diagram illustrating creation of a graphical program according to one embodiment.

FIG. 8—Creation of a Graphical Program

FIG. 8 is a flowchart diagram illustrating creation of a graphical program according to one embodiment of the invention. As shown, at 801 the user may arrange on a screen (i.e., a display device) a graphical program or block diagram. This may include the user placing and connecting (e.g., wiring) various nodes (e.g., represented by icons) on the display screen in order to configure a graphical program. More specifically, the user may select various function nodes or other nodes and place or drop the nodes in a block diagram panel, and then connect or "wire up" the nodes to assemble the graphical program. One of the nodes may be a display node that is executable to transfer and display an image. The user may also assemble a user interface, which may be referred to as a front panel, including controls and indicators that indicate or represent input/output to/from the graphical program. A graphical program targeted to measurement or automation applications may be referred to as a virtual instrument (VI). The graphical program or VI may have a hierarchy of sub-graphical programs or sub-VIs.

In the preferred embodiment, the graphical programming system is the LabVIEW graphical programming system available from National Instruments. For more information on creating a graphical program in the LabVIEW graphical programming system, please refer to the LabVIEW system available from National Instruments as well as the above patent applications incorporated by reference.

In response to the user arranging on the screen a graphical program, the method may operate at 803 to develop and store a tree of data structures that represent the graphical program. Thus, as the user places and arranges on the screen function nodes, structure nodes, input/output terminals, and connections or wires, etc., the graphical programming system may operate to develop and store a tree of data structures that represent the graphical program. More specifically, as the user assembles each individual node and wire, the graphical programming system may operate to develop and store (or populate) a corresponding data structure in the tree of data structures which represents the individual portion of the graphical program that was assembled. Thus, 801 and 803 may be an iterative process that is repetitively performed as the user creates the graphical program. In one embodiment, the graphical programming system may automatically develop and store VDiagram data structures in response to the user creating the graphical program.

In an alternate embodiment, as the user places, arranges and interconnects nodes on the display, scripts, DLLs, or other code may be created in memory.

In one embodiment, the user may optionally place constructs in the graphical program that indicate respective portions of graphical code, which are either to be compiled into machine code for execution by a CPU or converted to a hardware description for implementation in a programmable hardware device such as an FPGA.

Thus, the various methods described above may operate to deploy a graphical program implementing an image display function onto a programmable or configurable device, such as an image acquisition device, e.g., an image acquisition board or smart camera, thereby enabling the device to perform the function. The graphical program may include a display node that, when executed, may operate to transfer an image from an image acquisition device to a remote computer system for display.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A computer-accessible memory medium comprising program instructions for displaying an image, wherein the program instructions are executable by a processor to:
   create a graphical program on a display in response to user input, wherein the graphical program comprises a plurality of interconnected icons which visually indicates functionality of the graphical program, and wherein the graphical program comprises a first icon for displaying an image;
   store the graphical program on a first embedded system;
   executing the graphical program on the first embedded system;
   wherein, if the first embedded system is coupled to a second system having a display device, said executing the graphical program comprises:
      transferring the image to the second system; and
      directing the second system to display the image on the display device of the second system.

2. The memory medium of claim 1, wherein, if the first embedded system is not coupled to a second system having a display device, said executing the graphical program does not direct the second system to display the image.

3. The memory medium of claim 1, wherein the graphical program further comprises a second icon for acquiring another image, wherein, if the first embedded system is coupled to the second system having the display device, said executing the graphical program further comprises:
   transferring the second image to the second system; and
   directing the second system to display the other image on the display device of the second system.

4. The memory medium of claim 1,
   wherein said transferring the image to the second system causes the image to be displayed on the display device of the second system without requiring any user written code.

5. The memory medium of claim 1,
   wherein the second system is a host computer system, wherein the first embedded system is comprised in the host computer system.

6. The memory medium of claim 5, wherein the first embedded system is a card having a functional unit which is operable to execute the graphical program, wherein the card is coupled to a slot of the host computer system.

7. The memory medium of claim 1,
   wherein the first embedded system is coupled to a network;
   wherein the second system is also coupled to the network;
   wherein said transferring comprises transferring the image across the network to the second system.

8. The memory medium of claim 7,
   wherein said transferring the image to the second system comprises causing the image to be displayed on the display device of the second system without requiring any user written network code for performing said transferring.

9. The memory medium of claim 7,
   wherein said transferring the image to the second system comprises transferring the image according to a TCP/IP (Transmission Control Protocol/Internet Protocol) protocol.

10. The memory medium of claim 1, wherein said transferring comprises transferring the image to the display device via an IEEE 1394 bus.

11. The memory medium of claim 1, wherein said transferring comprises transferring the image to the display device via a Universal Serial Bus.

12. The memory medium of claim 1, wherein the program instructions are further executable to:
   execute the graphical program on a third system which comprises a display device, wherein execution of the graphical program comprises displaying the image on the display device of the third system.

13. The memory medium of claim 1,
   wherein said directing the second system to display the image comprises transferring information with the image.

14. The memory medium of claim 13,
   wherein the information directs the second system to display a region of interest of the image on the display device.

15. The memory medium of claim 13, wherein the information directs the second system to display options corresponding to a plurality of tools on the display device.

16. The memory medium of claim 13, wherein the information directs the second system to display the image at certain coordinates on the display device.

17. The memory medium of claim 1, wherein the information directs the second system to display a timestamp indicating a time at which the image was acquired on the display device.

18. The memory medium of claim 13, wherein the program instructions are further executable to receiving input indicative of a user-specified region of interest prior to said transferring the information with the image, wherein the information directs the second system to update display of a region of interest on the display device.

19. The memory medium of claim 1, wherein the program instructions are further executable to:
   automatically detecting whether the first embedded system is 1) coupled to a host computer system; or 2) coupled to a network;
   wherein said transferring and said directing is performed if the first embedded system is either 1) coupled to a host computer system; or 2) coupled to a network.

20. The memory medium of claim 1, wherein the program instructions are further executable to compress the image prior to said transferring and decompress the image prior to said directing.

21. A computer accessible memory medium comprising program instructions executable to:
   create a graphical program on a display in response to user input, wherein the graphical program comprises a plurality of interconnected icons which visually indicates functionality of the graphical program, and wherein the graphical program comprises an icon for displaying a image; and
   store the graphical program on a first embedded system;
   wherein, if the first embedded system is coupled to a second system having a display device, execution of the graphical program operates to transfer the image to the second system and to cause the image to be displayed on the display device of the second system.

22. The computer accessible memory medium of claim 21,
   wherein, if the first embedded system is not coupled to a system having a display device, no display operation is performed during execution.

23. The computer accessible memory medium of claim 21,
   wherein the first embedded system is coupled to a network;
   wherein the second system is also coupled to the network;
   wherein the graphical program executes to transfer the image across the network to the second system and cause the image to be displayed on the display device of the second system.

24. The computer accessible memory medium of claim 21,
   wherein the graphical program executes to transfer the image to the second system and cause the image to be displayed on the display device of the second system without requiring any user written network code.

25. The computer accessible memory medium of claim 21,
   wherein the second system is a host computer system, wherein the first embedded system is comprised in the host computer system.

26. The computer accessible memory medium of claim 25, wherein the first embedded system comprises a card comprising a functional unit which is operable to execute the graphical program, wherein the card is coupled to a slot of the host computer system.

27. The computer accessible memory medium of claim 21,
   wherein if the graphical program is executed on a third system which comprises a display device, execution of the graphical program operates to display the image on the display device of the third system.

28. The computer accessible memory e medium of claim 21,
   wherein execution of the graphical program operates to transfer information with the image to the second system.

29. The computer accessible memory medium of claim 28,
   wherein the information directs the second system to display a region of interest of the image on the display device.

30. The computer accessible memory medium of claim 28,
   wherein the information directs the second system to display the image at certain coordinates on the display device.

31. The computer accessible memory medium of claim 21, wherein the program instructions are further executable to:
   compress the image, wherein the execution of the graphical program operates to transfer the compressed image to the second system.

32. The computer accessible memory medium of claim 21,
   wherein the graphical program also comprises an icon for acquiring an image; and
   wherein, if the graphical program is executed on a first embedded system that is coupled to a second system having a display device, execution of the graphical program operates to transfer the image to the second system and to cause the image to be displayed on the display device of the second system.

33. A method for displaying an image, the method comprising:
   creating a graphical program on a display in response to user input, wherein the graphical program comprises a plurality of interconnected icons which visually indicates functionality of the graphical program, and wherein the graphical program comprises a first icon for acquiring an image and a second icon for displaying the image;
   storing the graphical program on a first system;
   executing the graphical program on the first system;
   wherein, if the first system comprises a display, said executing the graphical program comprises displaying the image on the display of the first system;
   wherein, if the first system is an embedded system, and the embedded system is coupled to a second system having a display device, said executing the graphical program comprises transferring the image to the second system and causing the image to be displayed on the display of the second system;
   wherein, if the first system is an embedded system, and the embedded system is not coupled to a second system having a display device, said executing does not comprise display operations with the second system.

34. The method of claim 33,
   wherein the first system is coupled to a network;
   wherein the second system is also coupled to the network;
   wherein said executing the graphical program comprises transferring the image across the network to the second system and causing the image to be displayed on the display device of the second system.

35. The method of claim 33,
   wherein said executing comprises transferring the image to the second system and causing the image to be displayed on the display device of the second system without requiring any user written network code.

36. The method of claim 33,
   wherein the second system is a host computer system, wherein the embedded system is comprised in the host computer system.

37. The method of claim 36,
   wherein the embedded system comprises a card comprising a functional unit which is operable to execute the graphical program, wherein the card is coupled to a slot of the host computer system.

38. The method of claim 33, wherein, if the first system is a host computer system that comprises another display device, said executing the graphical program comprises displaying the image on the other display of the host computer system.

39. The method of claim 33,
wherein said transferring and causing the second system to display the image comprises transferring control information with the image.

40. The method of claim 39,
wherein the control information directs the second system to display a region of interest of the image on the display device.

41. The method of claim 39, wherein the control information directs the second system to display the image at certain coordinates on the display device.

42. The method of claim 33, wherein said executing comprises automatically detecting whether the first system is 1) coupled to a host computer system; or 2) coupled to a network.

43. The method of claim 33, wherein said executing comprises compressing the image prior to transferring the image.

44. A computer accessible memory medium comprising program instructions executable to:
create a graphical program on a display in response to user input, wherein the graphical program is operable to acquire an image, wherein the graphical program comprises a plurality of interconnected icons which visually indicates functionality of the graphical program, and wherein the graphical program comprises a first icon for displaying the image; and
store the graphical program on a first embedded system;
wherein if the graphical program is executed on the first embedded system coupled to a second system having a display device, said executing comprises:
transferring the image to the second system; and
directing the second system to display the image on the display device of the second system.

45. The computer accessible memory medium of claim 44,
wherein, if the first embedded system is not coupled to a second system having a display device, executing the graphical program does not comprise display operations.

46. A method for displaying an image, the method comprising:
creating a graphical program on a display in response to user input, wherein the graphical program is operable to receive an image, wherein the graphical program comprises a plurality of interconnected icons which visually indicates functionality of the graphical program, and wherein the graphical program comprises a first icon for displaying the image;
storing the graphical program on a first embedded system; and
executing the graphical program on the first embedded system;
wherein the first icon is polymorphic, and wherein said executing the graphical program performs different operations depending on whether the embedded system is coupled to a display device.

47. A system for displaying an image, the system comprising:
a first system, wherein the first system comprises a display devise; and
an embedded system coupled to the first system, wherein the embedded system comprises a processor and memory medium coupled to the processor;
wherein the memory medium stores a graphical program which is executable by the processor, wherein the graphical program was graphically created on a display, wherein the graphical program comprises a plurality of interconnected icons which visually indicates functionality of the graphical program, and
wherein the graphical program comprises an icon for displaying an image;
wherein during execution of the graphical program, the image is transferred to the first system and the image is displayed on the display device of the first system.

* * * * *

UNITED STATES PATENT AND TRADEMARK OFFICE
CERTIFICATE OF CORRECTION

PATENT NO. : 7,293,112 B2 Page 1 of 1
APPLICATION NO. : 10/292260
DATED : November 6, 2007
INVENTOR(S) : Cone et al.

It is certified that error appears in the above-identified patent and that said Letters Patent is hereby corrected as shown below:

<u>Column 23</u>
Line 57, please delete "computer accessible memory e medium" and substitute
-- computer accessible memory medium --.

Signed and Sealed this

First Day of April, 2008

JON W. DUDAS
*Director of the United States Patent and Trademark Office*